March 18, 1924.

H. N. PACKARD

FLUID METER

Filed April 13, 1918     3 Sheets-Sheet 1

1,487,356

Inventor
Horace N. Packard
by Edwin B H Tower Jr Atty.

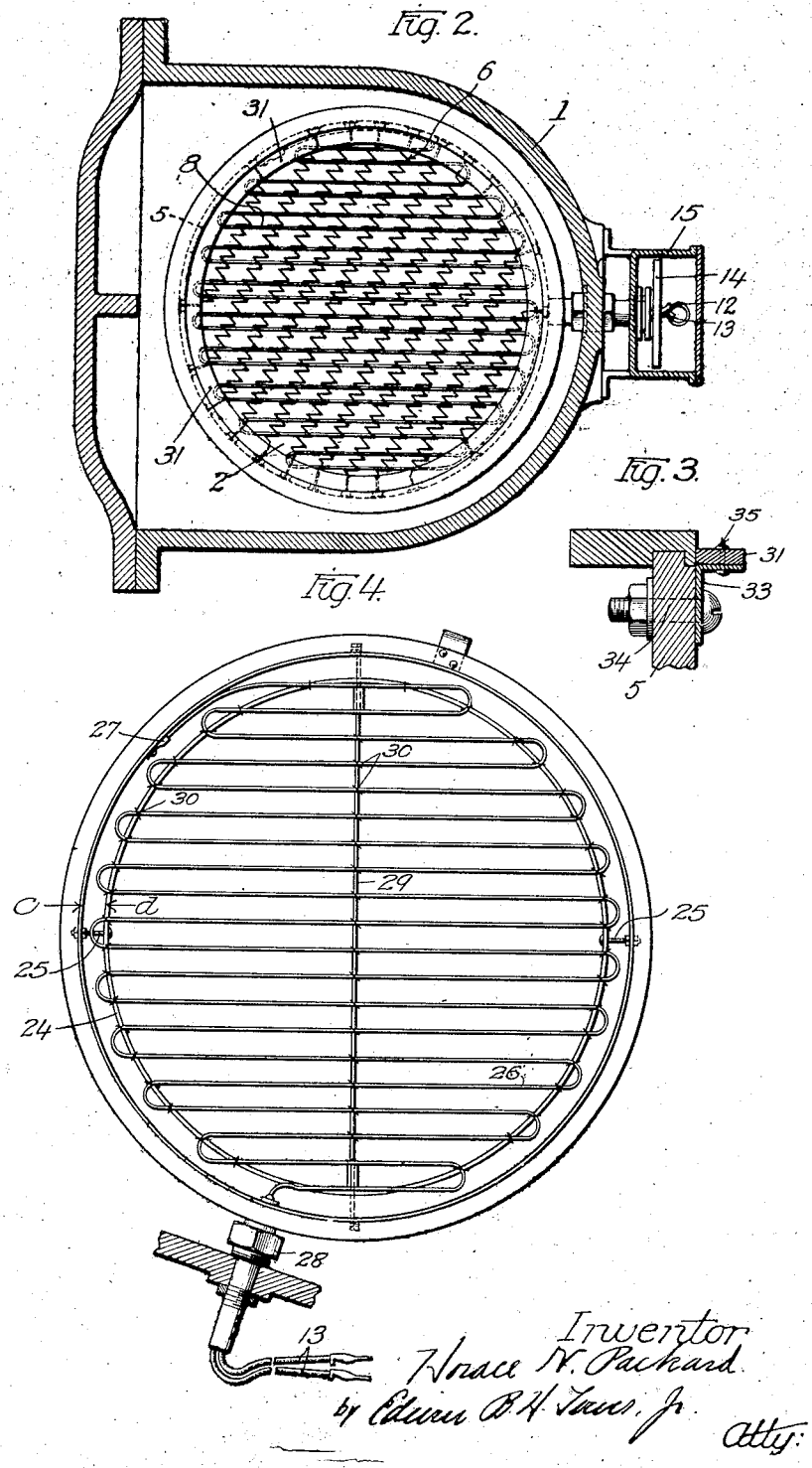

March 18, 1924.
H. N. PACKARD
FLUID METER
Filed April 13, 1918 3 Sheets-Sheet 3
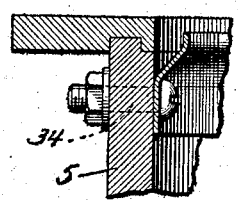
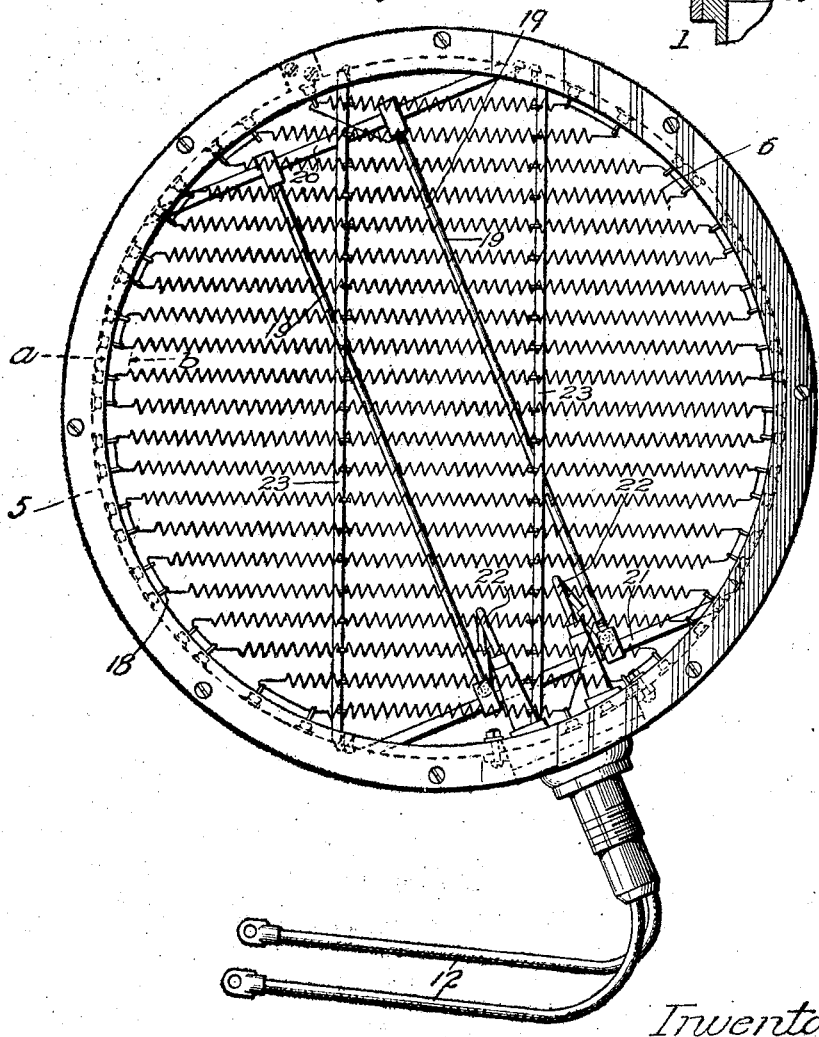
Inventor
Horace N. Packard Patented Mar. 18, 1924.

1,487,356

UNITED STATES PATENT OFFICE.

HORACE N. PACKARD, OF MILWAUKEE, WISCONSIN, ASSIGNOR TO THE CUTLER-HAMMER M'F'G CO., OF MILWAUKEE, WISCONSIN, A CORPORATION OF WISCONSIN.

FLUID METER.

Application filed April 13, 1918. Serial No. 228,398.

*To all whom it may concern:*

Be it known that I, HORACE N. PACKARD, a citizen of the United States, residing at Milwaukee, in the county of Milwaukee and State of Wisconsin, have invented new and useful Improvements in Fluid Meters, of which the following is a specification.

This invention relates to fluid meters and particularly to fluid meters of the thermal type.

Thermal fluid meters have been developed for measuring the rate of flow of fluids by causing a heat transfer between a body and a fluid and utilizing the effect of the heat transfer in determining the rate of flow of the fluid.

The commercial types of such meters usually have an electrical heater for imparting heat to the fluid, and an electrical thermometer resistance disposed at each side of the heater for measuring the temperature of the fluid before and after it is heated by the heater.

Various different methods may be employed for measuring the rate of flow of the fluid but usually the thermometer resistances act through automatic mechanism to control the electrical energy supplied to the heater in such a manner as to maintain a constant temperature rise in the fluid between the points where the thermometer resistances are located. The energy consumed by the heater in maintaining this constant temperature rise will then be an indication of the rate of flow of the fluid. A meter operating upon this principle is disclosed in the patent to C. C. Thomas, No. 1,222,492 of April 10th, 1917.

The heater and thermometer resistances are usually in the form of resistors distributed across the conduit through which the fluid to be measured flows. The resistors are so supported in the conduit that they do not closely approach the inner surface of the conduit and do not directly contact with the walls of the conduit at any more points than necessary. This is for the purpose of reducing heat conduction losses from the resistors to the walls of the conduit, and in the case of the heater is also for the purpose of reducing electrical losses such as might occur if deposits formed at the junction of the resistor with the walls of the conduit. When these electrical and thermal conduction losses are guarded against it is difficult to uniformly distribute the resistors across the entire area of the conduit. There therefore occurs near the walls of the conduit an annular space over which the resistor is not as uniformly distributed as it is distributed over the central portion of the conduit.

It has been found in practice that the above mentioned annular space between the resistors and the walls of the conduit permits an annular stream of the fluid to pass by the resistors which does not come in contact with the same proportion of resistance material as the rest of the fluid. This will cause errors in the reading of the meter.

Furthermore, in meters of this type it has been found that the friction which occurs between the fluid and the inner surface of the conduit before the fluid reaches the meter causes a material retardation of flow along this surface. This causes non-uniform velocity stream lines so that when the fluid reaches the meter the fluid adjacent to the walls of the conduit is not flowing as fast as the fluid in the central part of the stream. These non-uniform velocity stream lines are objectionable because the present type of meter requires a fairly uniform fluid velocity across the stream section for accurate results. Although these non-uniform velocity stream lines are caused mainly by the friction which takes place before the fluid reaches the meter, they may also be produced to a slight extent as the fluid flows through the meter. Therefore, even though these objectionable non-uniform velocity stream lines are corrected before the fluid reaches the meter, it may also be advisable to prevent further friction and further development of non-uniform velocity stream lines during the time that the fluid is flowing through the meter.

One object of the present invention is to provide a meter having means for preventing errors due to all of the above mentioned causes.

Another object is to provide means for insuring accuracy of a meter in which the measuring elements do not occupy the entire cross-sectional area of the conduit.

Another object is to provide a meter having means for preventing errors due to the friction which occurs between the fluid and the walls of the conduit before the fluid reaches the meter.

Another object is to provide means for preventing the friction which occurs between the fluid and the walls of the meter and which occurs between the fluid and the walls of the conduit in advance of the meter from affecting the accuracy of the meter.

Other objects and advantages will hereinafter appear.

An embodiment of the invention is illustrated in the accompanying drawings. The views of the drawings are as follows:

Figure 2 is a horizontal section taken on the line 2—2 of Figure 1.

Figure 3 is a detail view showing the manner in which the reducing rings are mounted in the meter.

Figure 4 is plan view of one of the thermometer units.

Figure 5 is a plan view of a heater unit without the reducing rings.

Figure 6 is a view similar to Fig. 3 showing a modified form of reducing ring, and Figure 7 is a vertical section of a meter having modified means for producing a stream of fluid which will have a uniform velocity across its entire section when the fluid reaches the meter.

Figure 1:
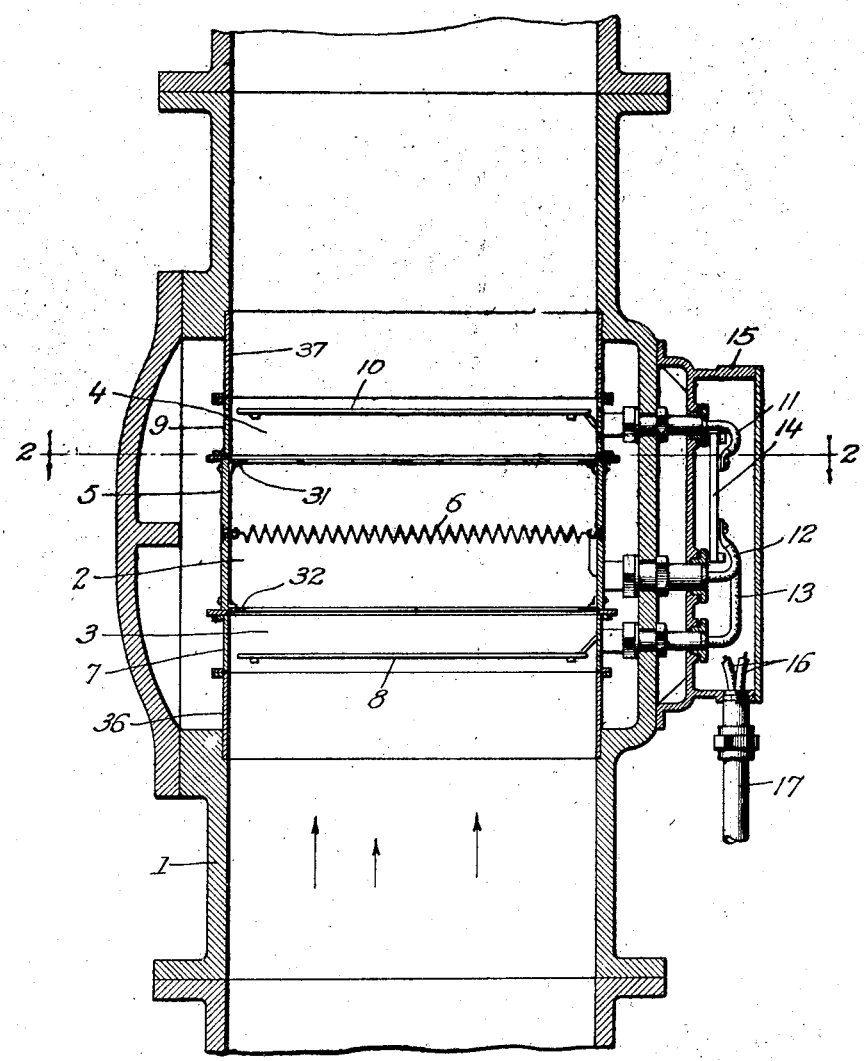
Figure 1 is a vertical section of a fluid meter constructed in accordance with the invention.

The meter comprises a housing 1 containing the heater unit 2 and the thermometer units 3 and 4. These units will be hereinafter more specifically described, but for the present it is sufficient to note that the heater unit comprises a cylindrical frame 5 across which is distributed a resistor 6 for imparting heat to the fluid. The entrance thermometer unit 3 comprises a cylindrical frame 7 across which is distributed a resistor 8 which serves as a thermometer resistance in the well known manner to measure the temperature of the incoming fluid. The exit thermometer unit 4 likewise comprises a cylindrical frame 9 provided with a thermometer resistance 10 to measure the temperature of the fluid after it has been heated by the heater.

The cylindrical frames 5, 7 and 9 of the heater and thermometer units together with the end sleeves 36 and 37 constitute a passage for the fluid which forms a continuation of the passage in the conduit.

Current is supplied to all of the resistors by means of conductors 11, 12 and 13 which lead to a suitable terminal board 14 mounted in a terminal box 15. The external conductors represented at 16 may be led to the terminal box 15 through a conduit 17 and properly connected to the terminal board 14.

As above stated, the heater and thermometer resistances may be utilized to determine the rate of flow of the fluid in various different ways. If desired the automatic devices shown in the above mentioned patent to C. C. Thomas may be used and then the amount of energy consumed by the heater in maintaining a constant temperature rise in the fluid between the points where the thermometer resistances are located will be an indication of the rate of flow of the fluid. These automatic devices have not been illustrated as the present invention deals only with the construction of that portion of the meter which is associated directly with the fluid conduit.

In a meter of the above described type the heater unit 2 is usually constructed in the manner shown in Fig. 5.

In Fig. 5 the cylindrical frame 5 is provided with a series of inwardly projecting hooks 18 which support the resistor 6. The resistor is passed back and forth across the frame and looped over the hooks in the manner shown in the drawing. A pair of terminal rods 19 extend across the frame 5 and are supported by the bars 20 and 21. Current is supplied to the resistor 6 by making the proper electrical connections between the terminal rods 19 and the resistor. Current is supplied to the terminal rods by means of the conductors 22 which are electrically connected with the conductors 12 that lead to the terminal board 14. A pair of bars 23 extending across the frame 5 serve to aid in supporting the resistor 6.

Fig. 4 shows the manner in which the thermometer resistances are supported in their frames. As the two thermometer units are identical only the entrance thermometer unit will be described.

A ring 24 is supported within the cylindrical frame 3 by means of the bolts 25. These bolts are of small mass, and conduct but a negligible quantity of heat from the ring 24 to the walls of the frame 3. The thermometer resistance is supported on the ring 24. The resistance is in the form of a plurality of strands of wire positioned in a metal tube 26. One end of the tube is fixed to the frame as shown at 27 and then the tube is passed back and forth across the frame as shown in the drawing. The other end of the tube communicates with a terminal box 28 in which the resistance wires in the tube make electrical connection with the conductors 13 that lead to the terminal board 14. A rod 29 extends across the frame 3 to aid in supporting the tube 26. The tube 26 may be fastened to the rod 29 and the ring 24 wherever it crosses them by means of wire, thread or similar flexible fastening means as represented at 30.

It will now be noted that the resistor of the heater is so supported in the frame that it does not directly contact with the wall of the frame. This, as above explained, is for the purpose of reducing heat conduction from the resistor to the frame and for the purpose of preventing current losses such as might occur if the resistor came in direct contact with the frame. This manner of mounting the resistor results in the formation of an annular space the width of which is represented by the distance *a—b* (Fig. 5) in which the resistor is not distributed as uniformly as it is distributed over the central part of the frame.

Likewise in the case of the thermometer unit the tube 26 contacts with the walls of the frame only at the ends of the tube, and therefore the heat conduction to the frame is reduced to a minimum. However, by mounting the tube 26 in this manner there is formed an annular space, the width of which is represented by *c—d*, over which the tube 26 is not distributed as uniformly as it is distributed over the central part of the frame.

The resistor of the heater and thermometer units is therefore not distributed as uniformly over the space immediately adjacent to the walls of the conduit as it is distributed over the central part of the conduit. This non-uniform distribution of the resistor would introduce errors in the reading of the meter if these errors were not prevented, because that portion of the fluid flowing adjacent the inner surface of the conduit would not come in contact with the same proportion of resistor as the portion of fluid flowing in the central part of the conduit.

In order to prevent inaccuracies due to the above cause, the heater unit is provided with inwardly projecting flanges or reducing rings 31 and 32. One of these rings is secured to the upper portion of the frame 5 and the other is secured to the lower portion of the frame. They may be held in place in any suitable manner as by the brackets 33 secured to the frame 5 by the bolts 34 as shown in Fig. 3. The reducing ring may be riveted to the bracket by means of the rivets 35.

The reducing rings 31 and 32 project inwardly a distance which is substantially equal to the width of the annular spaces *a—b* and *c—d* above described over which the resistor is not as uniformly distributed as over the rest of the conduit. This is best shown in Fig. 2.

When the fluid is flowing through the conduit these reducing rings reduce the cross section of the stream of fluid so that practically all of the fluid will be caused to flow through that part of the conduit over which the resistor is uniformly distributed. In other words, the reducing rings cut off the flow of fluid through the above described annular space adjacent the walls of the conduit. The cross section of the stream of fluid is reduced to substantially the same size as the area over which the resistor is uniformly distributed. All of the fluid will therefore be uniformly acted upon by the resistors or vice versa, and hence no error in the reading of the meter will result from the fact that the resistors are not uniformly distributed across the entire area of the conduit.

The reducing rings also serve to deflect the low velocity stream lines caused by the friction between the fluid and the walls of the conduit in advance of the meter, into the central portion of the fluid stream, so that these low velocity stream lines will then have practically the same velocity as the fluid flowing in the central portion of the stream. The result is that when the fluid is measured all parts of the fluid are flowing at substantially the same velocity. It will be noted that the reducing rings not only prevent errors which would occur due to the friction which takes place before the meter is reached by the fluid, but they also prevent further friction taking place as the fluid flows through the meter. This is due to the fact that the stream of fluid is reduced in cross section so that it does not contact with the walls of the meter while it is being measured. The possibility of the low velocity stream lines being again produced as the fluid flows through the meter is therefore eliminated.

The reducing rings may, of course, be shaped in various different ways. For instance, they might assume the shape shown in Fig. 6. The rings will then act as rounded orifices to properly size the stream of fluid. The type of reducing rings shown in Fig 6 may under some circumstances produce a more efficient sizing of the stream of fluid than the flat rings described above. The converging throat with its curved walls serves to prevent eddy currents such as might occur immediately in front of the flat rings, and also causes the stream of fluid to definitely assume the size and shape of the exit opening of the ring, and this size and shape are maintained throughout a considerable travel of the fluid. The eddy currents that are produced in the vicinity of the flat rings may prevent the stream of fluid from assuming the exact shape and size of the opening in the ring as the fluid passes therethrough.

It will now be seen that the reducing rings constitute means for preventing errors which would ordinarily occur from the non-uniform distribution of the resistors across the entire area of the conduit. They also constitute means for preventing errors which would ordinarily occur as the result of the low velocity stream lines in the fluid when the latter reaches the meter, and they further constitute means for preventing errors which would ordinarily occur due to the friction between the fluid and the walls of the meter as the fluid is being measured.

Obviously, as many of the reducing rings may be used as necessary, and they may be positioned in the conduit wherever desired. If it is found that the use of the two rings does not properly size the stream of fluid before it reaches the entrance thermometer resistance 8, and if it be desired to size the stream of fluid before it reaches this thermometer resistance, the number and location of the rings may be varied to effect such results.

Fig. 7 shows a modified form of meter in which the low velocity stream lines which occur in the fluid before the meter is reached are thrown into the central portion of the stream in a slightly different manner than described above. In this instance the sleeves 36 and 37 shown in Fig. 1 are shaped in the manner shown at 36' and 37' in Fig. 7. These sleeves, when given the proper curvature, form rounded orifices which cause the low velocity fluid adjacent the walls of the conduit to be deflected into the high velocity stream at the center. With the proper curvature of these sleeves an almost uniform velocity may be obtained across the entire meter section. The sleeves therefore constitute means for eliminating errors which would ordinarily occur due to the low velocity stream lines produced by the friction between the fluid and the walls of the conduit in advance of the meter.

The results described above may be accomplished by means other than those herein disclosed. However, several embodiments of the invention have been specifically described for illustrative purposes, and therefore the specific description should not be construed in a limiting sense.

What I claim is:

1. In a fluid meter the combination with measuring means including a fluid passage and a meter element to substantially conform with the shape and size of said passage but having a clearance with the walls of such passage, of means located within said passage to reduce the cross section of the stream of fluid passing said element.

2. In a fluid meter, the combination with a meter unit to be inserted in a conduit, said unit having a passage therein and a meter element of a shape to conform substantially to the contour of said passage located within said passage and having a clearance with the walls thereof, of means located within said passage to reduce the cross section of the stream of fluid passing said element.

3. A fluid meter comprising a conduit, a resistor supported therein and distributed uniformly over an area less than the cross sectional area of said conduit and means to reduce the diameter of the stream of said fluid flowing in said conduit to insure passage of the entire stream through the area over which said resistor is uniformly distributed.

4. A fluid meter comprising a conduit, a resistor supported therein and distributed uniformly over an area less than the cross sectional area of said conduit and means restricting the passage in said conduit to insure flow of the entire stream of fluid within said conduit through the area over which said resistor is uniformly distributed, said means also forming within said conduit a pocket about said resistor to surround the latter with fluid of low velocity.

5. A fluid meter comprising a conduit section, a meter element positioned therein and distributed uniformly over a transverse area thereof less than the total cross sectional area and a ring restricting the passage in said conduit to provide for flow of the entire stream of fluid within said conduit section through said area over which said element is uniformly distributed.

6. A measuring unit for fluid meters comprising a conduit, a plurality of meter elements positioned therein and distributed uniformly over like transverse areas thereof, each less than the total cross sectional area of said conduit, and a plurality of rings arranged to insure flow of the entire stream of fluid within said conduit through said areas over which said elements are uniformly distributed.

7. A measuring unit for fluid meters comprising a conduit section, reducing rings mounted therein in a spaced relation and a resistor mounted in said conduit section in a spaced relation to the walls thereof, said resistor being uniformly distributed over an area equal to the cross sectional area of a stream of fluid passing through said rings.

In witness whereof, I have hereunto subscribed my name.

HORACE N. PACKARD.